United States Patent [19]

Schmitt

[11] 4,446,781
[45] May 8, 1984

[54] APPARATUS FOR THE MECHANICAL/THERMAL TREATMENT, INCLUDING STERILIZATION AND PASTEURIZATION, OF FLUIDS

[75] Inventor: Armin Schmitt, Heusenstamm, Fed. Rep. of Germany

[73] Assignee: LUWA AG, Zurich, Switzerland

[21] Appl. No.: 359,783

[22] Filed: Mar. 19, 1982

[30] Foreign Application Priority Data

Mar. 21, 1981 [EP] European Pat. Off. ........ 81102148.4

[51] Int. Cl.³ ........................... A23G 1/00; A23G 1/06
[52] U.S. Cl. ......................................... 99/483; 99/517; 366/149
[58] Field of Search ................. 99/452, 453, 455, 467, 99/470, 483, 484, 516, 517; 426/231, 465, 520, 521; 366/144, 147, 149, 169, 172, 338; 159/6.2

[56] References Cited

U.S. PATENT DOCUMENTS

| | | | |
|---|---|---|---|
| 2,004,009 | 6/1935 | Moir | 99/517 X |
| 2,589,801 | 3/1952 | Grindrod | 99/483 X |
| 3,384,003 | 5/1968 | Sollich | 426/520 X |
| 3,638,553 | 2/1972 | Kreuter | 426/520 X |
| 4,238,516 | 12/1980 | Kreuter | 426/231 |
| 4,314,973 | 2/1982 | Aspa | 99/483 X |

*Primary Examiner*—Timothy F. Simone

*Attorney, Agent, or Firm*—Balogh, Osann, Kramer, Dvorak, Genova & Traub

[57] ABSTRACT

A process and apparatus for continuous mechanical/thermal treatment including sterilization of fluids and pastry masses such as cocoa masses. In accordance with the invention, a fluid or cocoa mass is subjected to a thin layer continuous treatment of deacidification, dehumidification and degasification in a thin layer device prior to delivery to a stow or sterilization reactor. Following sterilization and cooling, the treated cocoa mass is conveyed to a second thin layer device for residual deacidification, dehumidification and degasification, while in the stow or sterilization reactor, the cocoa mass is heated by internal friction, generating a temperature in the range of 100° C. to about 150° C. (preferably 135° C.) which is necessary for degermination. The degermination temperature is held at its average value by an external heat exchanger. The apparatus includes the stow or sterilization reactor placed between the two thin layer devices and connected to each one of them by conveyor lines. The heat exchanger is coupled to the reactor for adjusting any fluctuations in the degermination temperature so that it can be held at its average value. A cooling device is connected to the reactor at the outlet side thereof for cooling the treated cocoa mass to below 100° C. before being conveyed to the second thin layer device for further treatment.

6 Claims, 5 Drawing Figures

APPARATUS FOR THE MECHANICAL/THERMAL TREATMENT, INCLUDING STERILIZATION AND PASTEURIZATION, OF FLUIDS

The present invention is concerned with a process and an apparatus for the mechanical/thermal treatment, including sterilization and pasteurization, of fluids, especially cocoa masses.

The present day tendency is such that in respect of all types of food microbiological standards are being increasingly fixed both on a national and international plane. This specifically applies to cocoa since the cocoa growing countries no longer bring cocoa in the form of a raw product on the market but rather increasingly in the form of the semifinished product cocoa mass and other oil-containing kernels, such as peanut pastes, nut pastes, soybeam pastes etc. In the following, reference will be made to cocoa masses as these are of primary interest. Directives have, therefore, been elaborated defining the quality requirements placed upon roasted cocoa mass.

The limit values specified according to these directives and bacteriologically permitted are as follows:

| | |
|---|---|
| salmonellas | absent in 25 g |
| E-coli | absent in 1 g |
| coliform germs | max. 10/g |
| hyphomycetes | max. 50/g |
| total number of germs | max. $2 \cdot 10^5$/g |

Practice has shown that the cocoa masses offered on the market as a rule, do not reach these values and do not fall below them, respectively. Frequently, total germ numbers of $\geq 10^6$/g have been measured. Accordingly, the semi-finished product cocoa mass prior to being processed to chocolate masses will have to be degerminated by suitable measures as in one of the process operations of the chocolate mass manufacture, temperatures occur that would safeguard an efficient degermination.

One of the most important parameters in this respect is the so-called water activity $a_w$ $$a_w = \phi/100 \quad (\phi = \text{blance humidity})$$

indicating the relationship of the vapor pressure of a foodstuff versus the one of pure water.

Foodstuffs having a low water content such as cocoa mass thermally are substantially more difficult to degerminate than foodstuffs having a high water content such as, for example, milk. It has, for example, been evidenced that in salmonellas in the water activity range, increases by 0.6 in the resistance to the lethal effect of heat by factor 1000 can occur. For this reason, the semi-finished product cocoa mass prior to being further processed under all circumstances must be free of pathogenic germs.

The humid-thermal killing of micro-organisms adhering to the predried, peeled and broken cocoa beans, i.e. to the broken kernels, is already known in the art and, basically, the following processes are employed:

(a) a charge mixer the vessel of which is filled with broken kernel, circulates the latter. At the same time, 10 to 30% of an aqueous alkaline solution or water (based on the weight of the broken kernel) are uniformly sprayed upon the broken kernel and the broken kernel is treated under pressure and at a temperature of in excess of 125° C. The treatment time has a duration of about 30 to 60 minutes. The kernel is subsequently dried in vacuum and under a normal pressure (atmospheric pressure) respectively.

(b) In a roaster, the degermination is effected by a stepwise treatment under pressure and at a temperature in a manner similar as in (a).

The state-of-the-art discontinuous processes referred to under (a) and (b), it is true, permit the killing of all pathogenic germs, however, they involve the disadvantage that on account of the high acid and humidity content of the broken kernel and on account of the relatively extended treatment time required, taste affecting reactions (roast reactions) take place at the same time that in the sense of the intended roasting end state are unspecifical (deteriorated development of taste).

Cocoa masses that have been subjected to such a pre-treatment, predominantly are, therefore, used for the production of cocoa powder and rarely for the production of chocolate masses.

Obviously, hitherto it has not been possible to develop continuously operating systems for the degermination of cocoa masses, that would comply with the afore-mentioned requirements since the partly diametrically opposed requirements arising from the product properties of the cocoa mass, cannot be realized by prior art processes and systems.

On the one hand, it is known that:

(1) the heating of cocoa mass in a closed vessel (pressure) in temperature ranges >100° C. causes an undesired unspecific taste development because especially the resultant volatile components cannot freely diffuse.

(2) The negative effect referred to under (1) is the more so pronounced the higher especially the acid content of the mass is. Moreover, it increases with the level of the water content of the mass, the level of the mass temperature and the treatment duration.

(3) The higher the moisture content (acid+water) of the cocoa mass, as a rule, the poorer the fluidity properties thereof. The result thereof is that in predetermined cocoa grades and moisture contents as of $\approx 2\%$ upwardly, at temperatures in the range of 100° C. and in excess thereof, a complete standstill (solidification of the mass) occurs rendering substantially impossible the pumping and dispersing of the mass.

(4) Lowering of the water activity (reduction of the water percentage of the cocoa mass) reduces the thermal ability of killing the micro-organisms. The highest heat resistance of the majority of micro-organisms lies with water activities of $\approx 0.2 \ldots 0.3$.

It is, therefore, not possible to fall below a predetermined water concentration.

(5) Moreover, fats have protective effects, i.e. cocoa butter protects the bacteria and spores against the heat effect, and that largely in the water activity range from $\approx 0.2$ to 0.4 on account of the different magnitudes of the temperatures conductivity and the water diffusion into the fat.

Conversely, the degree of degermination is the higher the water content and the temperature of the mass and the more extended the treatment time are.

Basic to the invention is, therefore, the problem of providing a continuously operating process and an apparatus suitable herefore, by way of which the mass in the course of its usual treatment can be treated so as to kill the germs without affecting thereby the quality of taste.

This problem is solved by a process according to the invention.

In accordance with the process of the invention, for carrying out of which, in part, prior known systems are being used, the following steps are taken:

(1) Cocoa mass is first deacidified in a thin layer in an apparatus suitable herefore (DE Pat. No. 155 7184) at temperatures <100° C., dehumidified and degasified, with a water injecting process step according to DE Pat. No. 231 3563 (inoculating system) being suggested, depending on the acidity degree and the water content of the cocoa mass.

(2) The deacidified and degasified mass emerging from the system according to (1), with the aid of a pump is urged into the stow or sterilization reactor to be described in further detail and is stowed there, with the water content of the mass being—if so required—increased prior to entrance into the reactor by a further injection in accordance with DE Pat. No. 231 3563.

(3) In the stow or sterilization reactor, the mechanical/thermal treatment of the mass controlled in terms of time and temperature is performed, which permits the desired germ killing without a taste deterioration and without a negative change in structure of the cocoa mass, with:

(a) the required temperature of the cocoa mass being attained by friction and dissipation, respectively, with a steep temperature increase within the the mass, (b) the average dwelling time of the mass in the stow or sterilization reactor by the filling degree and by a recycling system possibly integrated being maintained in a statistically narrow distribution, and (c) minor temperature fluctuations of the mass being offset by additionally heating or cooling the reactor walls via the double sheath.

(4) The mass leaving the stow reactor with the aid of another pump is urged through a cooling mechanism, with the mass being cooled down to temperatures <100° C. with recondensation of the vapor phase.

(5) The mass emerging from the cooling mechanism is fed to another thin layer apparatus according to DE Pat. No. 155 71 84 where the required residual dehumidification and residual degasification take place.

The known apparatuses as used herefore, are preferably employed. However, other apparatuses bringing about similar effects are equally suitable.

The combination of prior known and newly developed aggregates results in that the diverging requirements of the product to be treated, are unraveled so to speak, and brings about amazing results:

For example, in a throughput of 1000 kg/h in the continuous operation, with a starting germ number of the cocoa mass of $\approx 1.2 \cdot 10^6$ germs/g, at a mass temperature of 120° C. and with an average dwelling time of the mass in the stow reactor of $\approx 1.5$ min, a cocoa mass absolutely free from pathogenic germs and unaffected in terms of taste, with a final germ content of $\approx 10,000$/g could be obtained.

An increase in the mass temperature by 5° ... 10° C. in the stow reactor even resulted in a final germ content of the mass of <500/g, with no significant changes in taste of the mass occurring either.

The water content of the cocoa mass in the reactor was $\approx 2.5\%$.

Hence it is essential and of a decisive importance that the mass with no interruption of the continuous flow, is stowed or placed in an average flow phase to generate in the stowed or blocking mass by friction the temperature required for germ killing.

Inasmuch as heat is supplied or discharged this, virtually is due to that the degerminating temperature generated by friction is held at its average value to attain at the one hand, a reliable germ destruction and, on the other hand, to avoid rises in temperature affecting the taste.

The process of the invention and the apparatus for carrying into effect the same will now be described by way of a graphical illustration of examples of embodiment, wherein.

Figure 1:
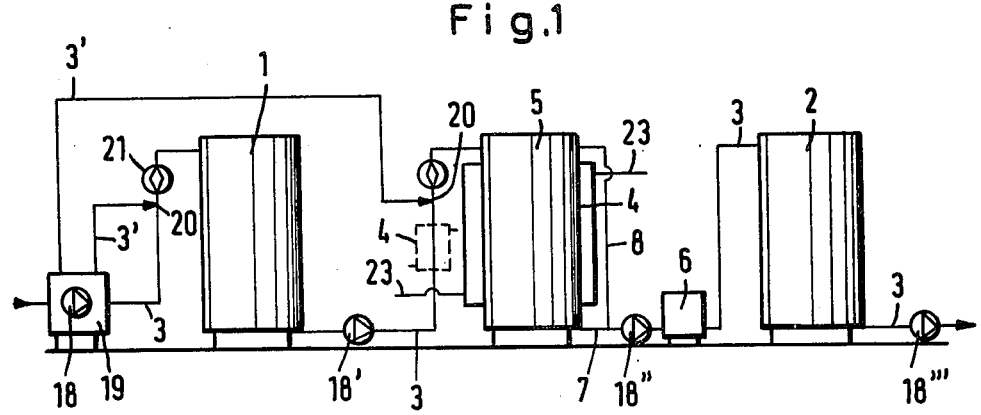
FIG. 1 is a block diagram of the apparatus.
Figure 2:
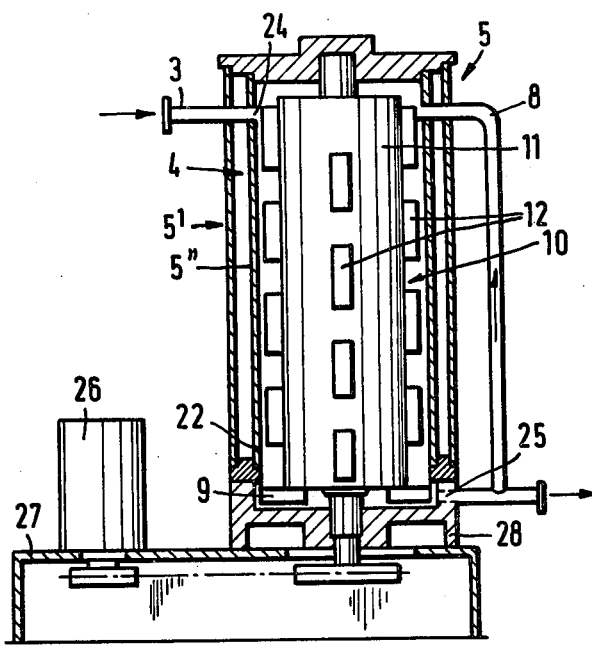
FIG. 2 is a section through the stow reactor.

According to FIG. 1, the apparatus and degermination system, respectively, substantially comprises two identical spaced apart thin layer devices 1,2 of a conventional construction that require no detailed description. Provided between these two devices 1,2—connected by corresponding lines 3—is stow reactor 5 details of which have been shown in section in FIG. 2. The mass through-flow takes place from left to right and is performed by pumps 18, 18', 18", 18'". Numeral 19 refers to an inoculation system equally of conventional construction from which via lines 3' water can be inoculated into lines 3' concerned and into the through-flowing mass, respectively.

Assembled behind the inoculating or terminating points 20 in lines 3 are so-called static mixers 21 equally of a conventional construction. The heat exchanger 4 by way of which merely the frictional and degerminating heat generated in stow reactor 5 is held in balance and at a corresponding average value, respectively, according to the example of embodiment is integrated as a double cover into stow reactor 5.

However, also it would be possible to couple a separate external (placed outside the reactor) flow heat exchanger (shown in dotted lines in FIG. 1).

The supply and discharge of the heat exchange medium controlled by a thermostat 22 (FIG. 2) is effected via corresponding connections 23.

Stow or sterilization reactor 5 is formed as a cylindrical housing 5' closed with the exception of the inlet and outlet apertures 24,25, in which rotor 11 rotates that is driven by a motor 26.

Motor 26 and reactor 5 are jointly seated on a base frame 27. The cylindrical rotor 11 inwardly defines an annular cylindrical stow gap 10 and on the surface thereof carries the friction and dissipating elements 12 for the circulation of which stow gap 10 is available. Provided at the bottom end of rotor 11 are blades that in conjunction with the rotor and the housing bottom 28 form a pump 9.

The discharge capacities of pumps 18, 18', 18", 18'" are identical while the discharge capacity of pump 9 is slightly higher so that a delivery surplus arises. As that surplus cannot be accepted by pump 18", the surplus amount must flow back into flow reactor 5 through branch line 8, with gap 10 of reactor 5 being more or less still filled with mass (theoretically, the entire inner space of stow reactor 5 can be filled), i.e. the mass in that rector is not present as a thin layer. When putting into operation the apparatus the whole system must, of course, be filled to such a degree that the desired stow and filling level arises in reactor 5. Only if the same has been reached, the sequence pumps 18″, 18‴ and also the thin layer device 2 can be put into operation.

Figure 5:
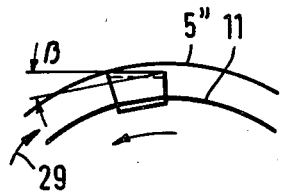
FIG. 5 is a plan view of the element according to FIGS. 3,4, associated to the rotor and the inner wall of the stow reactor.
Figures 3, 4:
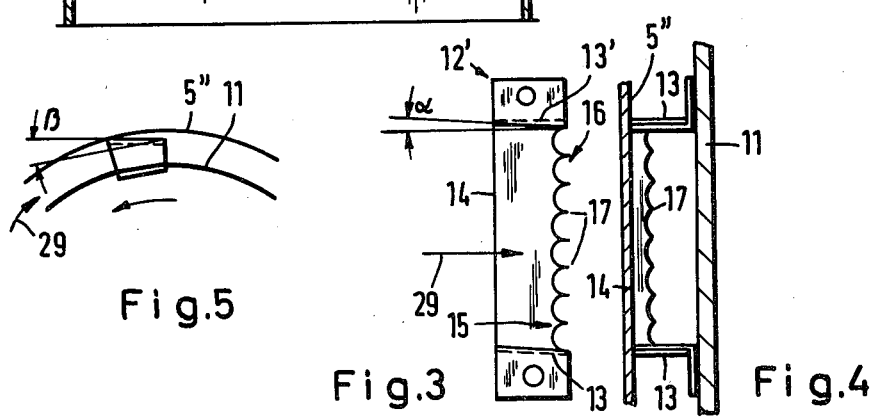
FIG. 3 is a radial view of a dissipation element in the form of a bracket.
FIG. 4 is a front view of the element according to FIG. 3.

The dissipation elements 12 projecting into the stow or flap gap 10, are generating the frictional heat in the mass, according to FIGS. 3 to 5, have the form of brackets 12′ mounted to the rotor surface, which brackets are so dimensioned and disposed that with the front edges 14 thereof they sweep the inner wall 5′.

To provide as many and strong flow breaks and hence turbulences in the mass as possible, flank webs 13 are positioned at a small angle $\alpha$ against the inflow direction 29.

The vertically positioned web 15 is at an angle $\beta$ (FIG. 5) and, finally, the entire rear edge 16 of web 15 is provided with mass breaking spikes 17. Through these elements 12 rotating with rotor 11 in the stowed mass, an extremely intensive turbulence occurs in the mass in connection with a heavy heat development. It is true, this heat is largely homogeneous which also applies to the average dwelling time of the mass particles.

Possible deviations, if any, from these average values are counter-acted: with respect to the temperature by outer heat exchanger 4 that substantially has to fulfill a cooling function rather than an additional heating function, and with respect to the dwelling time, by the partial recycling of the mass via line 8.

This will safeguard that almost each particle of the mass contained in stow or sterilization reactor 5 under pressure is subjected for a correspondingly extended period of time to the germ killing heat, i.e. the stow reactor safeguards optimum results, viz. high degerminating rates at dwelling times as short as possible and at optimum temperature loads, in that:

(a) it permits a steep temperature increase of the mass, i.e. it operates at a high energy density,
(b) the temperature fluctuation range within the mass is kept as small as possible, and
(c) the average statistical scattering of the dwelling time of the mass particles by their rated value is equally kept low.

| Example of embodiment: | |
|---|---|
| Height of stow reactor 5 | about 2 m |
| Inner diameter (5″) | about 0.5 m |
| Outer diameter of rotor 11 | about 0.45 m |
| Speed of rotation in rpm of rotor | 600 min$^{-1}$ |
| Throughput capacity | 1000 kg/h |
| Mass temperature in stow reactor | about 120° C. |
| Temperature of the mass at 19 | 50–60° C. |
| Temperature of the mass when leaving cooler 6 | 90° C. |
| Temperature of the mass behind the pump 18‴ | 80° C. |
| Average dwelling time of the mass in the stow reactor | 1,5 min |
| Pressure in the stow reactor 5 | about 2 bar |

Concerning the germ killing attained reference is made to p. 10, para. 4 of the introduction part to the specification.

The recirculation factor through branch line 8 for the stow mass was in the order of a tenfold of the discharge capacity of pump 18″.

Incidentally, measurements showed that under otherwise identical conditions, dissipation elements 11 having a straight rear edge 16 (i.e. without any break spikes 17) brought about as little as 1/5 of the energy reaction as compared with brackets 12′ according to FIG. 3.

What is claimed is:

1. An apparatus for continuous mechanical/thermal treatment and sterilization of fluids including cocoa mass, with the cocoa mass being subjected to a thin layer deacidification, dehumidification and degasification treatment prior to and after the sterilization thereof, the apparatus comprising first and second spaced apart thin layer treatment systems, a degermination system placed between said first and second thin layer treatment systems and conveyor lines connecting said degermination system to said first and second thin layer treatment systems, said degermination system comprising a sterilization reactor for receiving and treating the cocoa mass flowing thereinto from said first thin layer treatment system, a heat exchanger placed outside of the sterilization reactor and coupled thereto for adjusting temperature fluctuations of the cocoa mass inside the reactor, and a cooling device coupled to the reactor for cooling the cocoa mass flowing out of the reactor and being directed to said second thin layer treatment system, the sterilization reactor being provided with an inlet opening at its top section and an outlet opening at its bottom section, and a branch line disposed on the outside thereof being connected to said outlet opening and terminating into its top section for partial recycling of treated cocoa mass therethrough.

2. The apparatus according to claim 1, wherein the sterilization reactor is provided at its outlet opening side and ahead of the branch line with a pump having a rate of delivery which corresponds to the continuous rate of delivery of the cocoa mass plus the rate of delivery of the partially recycled cocoa mass flow diverted via the branch line into the reactor.

3. The apparatus according to claim 1, wherein the sterilization reactor is formed of a double-walled cylindrical housing closed with the exception of said inlet and outlet openings, and a rotor rotatably disposed in the reactor inwardly defining a cylindrical flow gap therein, and dissipation elements carried on the surface of said rotor project into the flow gap for generating frictional heat in the cocoa mass flowing therein.

4. The apparatus according to claim 3, wherein the dissipation elements are formed as brackets.

5. The apparatus according to claim 4, wherein the brackets are provided each with flank webs and a vertical web having its front edge in contact with the wall of said cylindrical housing, and said flank webs relative to the horizontal line and said vertical web are formed at an angular position.

6. The apparatus according to claim 5, wherein each of the brackets is provided with spikes on the rear edge thereof for breaking the cocoa mass formin in the cylindrical flow gap.

* * * * *